United States Patent [19]

Hornak et al.

[11] Patent Number: 4,820,479

[45] Date of Patent: Apr. 11, 1989

[54] GUIDE PIN ASSEMBLY FOR A NUCLEAR REACTOR

[75] Inventors: Leonard P. Hornak, Forest Hills; Robert E. Meuschke, Penn Hills Township, Allegheny County, both of Pa.

[73] Assignee: Westinghouse Electric Corp., Pittsburgh, Pa.

[21] Appl. No.: 154,404

[22] Filed: Feb. 10, 1988

[51] Int. Cl.[4] ............................................. G21C 3/32
[52] U.S. Cl. .................................... 376/446; 376/364
[58] Field of Search ................................. 376/364, 446

[56] References Cited

U.S. PATENT DOCUMENTS

| | | | |
|---|---|---|---|
| 4,036,692 | 7/1977 | Walton | 176/76 |
| 4,189,348 | 3/1980 | Donck et al. | 176/79 |
| 4,192,716 | 3/1980 | Anthony | 176/78 |
| 4,268,357 | 5/1981 | Formanek et al. | 176/78 |
| 4,534,933 | 8/1985 | Gjertsen et al. | 376/364 |
| 4,585,613 | 4/1986 | Styskal et al. | 376/260 |
| 4,664,874 | 5/1987 | Shawenberger | 376/261 |
| 4,667,547 | 5/1987 | Shawenberger | 82/4 R |
| 4,687,631 | 8/1987 | Wilson | 376/446 |
| 4,704,246 | 11/1987 | Hornak | 376/260 |

FOREIGN PATENT DOCUMENTS 0152207   8/1985   European Pat. Off. .

*Primary Examiner*—Donald P. Walsh
*Attorney, Agent, or Firm*—M. G. Panian

[57] ABSTRACT

A guide pin assembly for aligning the upper hold down plate of the top nozzle of a fuel assembly with the upper core plate of a pressurized water nuclear reactor includes a guide pin, a nut and a locking cup. The guide pin includes a nose, a threaded portion, a shaft, and an end. The radial alignment section of the shaft has a diameter that is approximately the diameter of a bore in the upper core plate of a nuclear reactor. The lower section of the shaft has a diameter less than that of the radial alignment section. The end includes a top having a diameter greater than that of the diameter of the bore in the upper core plate. The guide pin is insertable within a bore in the upper hold down plate of the top nozzle of the fuel assembly and through the bore in the upper core plate so that the nose and at least a portion of the threaded portion of the guide pin protrude above the upper core plate. The nut is adapted to be threaded onto the threaded outer surface of the threaded portion of the guide pin. The locking cup is securable about the nut and is adapted to engage engagement apparatus on the nose of the guide pin when the nut has been tightened onto the threaded portion of the guide pin so that the bottom of the nut abuts the upper surface of the upper core plate.

12 Claims, 2 Drawing Sheets

GUIDE PIN ASSEMBLY FOR A NUCLEAR REACTOR

BACKGROUND OF THE INVENTION

The invention relates to a guide pin assembly for aligning the upper hold down plate of the top nozzle of a fuel assembly with the upper core plate of a pressurized water nuclear reactor.

Fuel assemblies for pressurized water nuclear reactors are supported within the reactor core by upper and lower core plates. The upper and lower core plates are supported by a core support barrel, which in turn surrounds the reactor core and extends between the ends thereof. The number of fuel assemblies within the reactor core varies according to the size of the reactor core.

Such fuel assemblies include a plurality of guide tubes through which the control rods are inserted and withdrawn from the reactor core. The guide tubes are supported between a top nozzle and a bottom nozzle. The top nozzle includes an upper hold down plate, a lower adapter plate, and an enclosure forming a sidewall and extending between the upper hold down plate and the lower adapter plate. Generally, the top nozzle has a square cross-section, and includes a plurality of guide tubes, the number of which varies according to the size of the fuel assembly. The upper hold down plates of a plurality of top nozzles are aligned with, and secured to, the upper core plate to support a plurality of fuel assemblies below the upper core plate. The upper core plate and upper hold down plates of the top nozzles include aligned bores therethrough for the guide tubes.

As further described in U.S. Pat. No. 4,534,933 to Gjertsen et al., and assigned to the assignee of the present invention, guide pins are disposed between the upper hold down plate of the top nozzle of each fuel assembly and the upper core plate to properly align the upper core plate and the upper hold down plate of the top nozzle of the fuel assembly so that the guide tubes extend vertically. U.S. Pat. No. 4,534,933 is incorporated herein by reference. These guide pins must sometimes be replaced. The replacement of missing, broken or damaged guide pins is difficult without risking the exposure of plant personnel to dangerous levels of radiation.

It is an object of the invention to develop a remotely installable guide pin assembly for aligning the upper core plate of the reactor with the upper hold down plate of the top nozzle of a fuel assembly.

SUMMARY OF THE INVENTION

The present invention is a guide pin assembly for aligning the upper hold down plate of the top nozzle of a fuel assembly with the upper core plate of a pressurized water nuclear reactor. The guide pin assembly includes a guide pin, a nut and a locking cup.

The guide pin has a generally circular cross-section and includes a nose, a threaded portion, a shaft, and an end. The nose has engagement means thereon. The threaded portion, adjacent the nose, has a threaded outer surface. The shaft, adjacent the threaded portion, has an upper section, a lower section, and a radial alignment section between the upper and lower sections. The radial alignment section of the shaft has a diameter that is approximately the diameter of a first bore in the upper core plate of a nuclear reactor, and the lower section of the shaft has a diameter less than that of the radial alignment section. The end, adjacent the shaft, includes a top having a diameter greater than that of the diameter of the first bore in the upper core plate.

The guide pin is adapted to be inserted within a second bore in the upper hold down plate of the top nozzle of the fuel assembly and through the first bore in the upper core plate of a nuclear reactor from the bottom of the first bore in the upper core plate so that the nose and at least a portion of the threaded portion of the guide pin protrude above te upper core plate.

The nut is adapted to be threaded onto the threaded surface of the guide pin, and includes a top and a bottom.

The locking cup is securable about the nut and is adapted to engage the engagement means on the nose of the guide pin when the nut has been tightened onto the threaded surface of the threaded portion of the guide pin so that the bottom of the nut abuts the upper surface of the upper core plate.

The guide pin assembly of the invention is remotely installable within the second bores and first bores of the upper hold down plate of the top nozzle and the upper core plate, respectively, in an operating nuclear reactor without the risk of exposing plant personnel to dangerous levels of radiation.

DESCRIPTION OF THE DRAWINGS

The invention will become readily apparent from the following description of a preferred embodiment thereof shown, by way of example in the accompanying drawings, wherein.

DETAILED DESCRIPTION OF THE PREFERRED EMBODIMENTS

Figure 1:
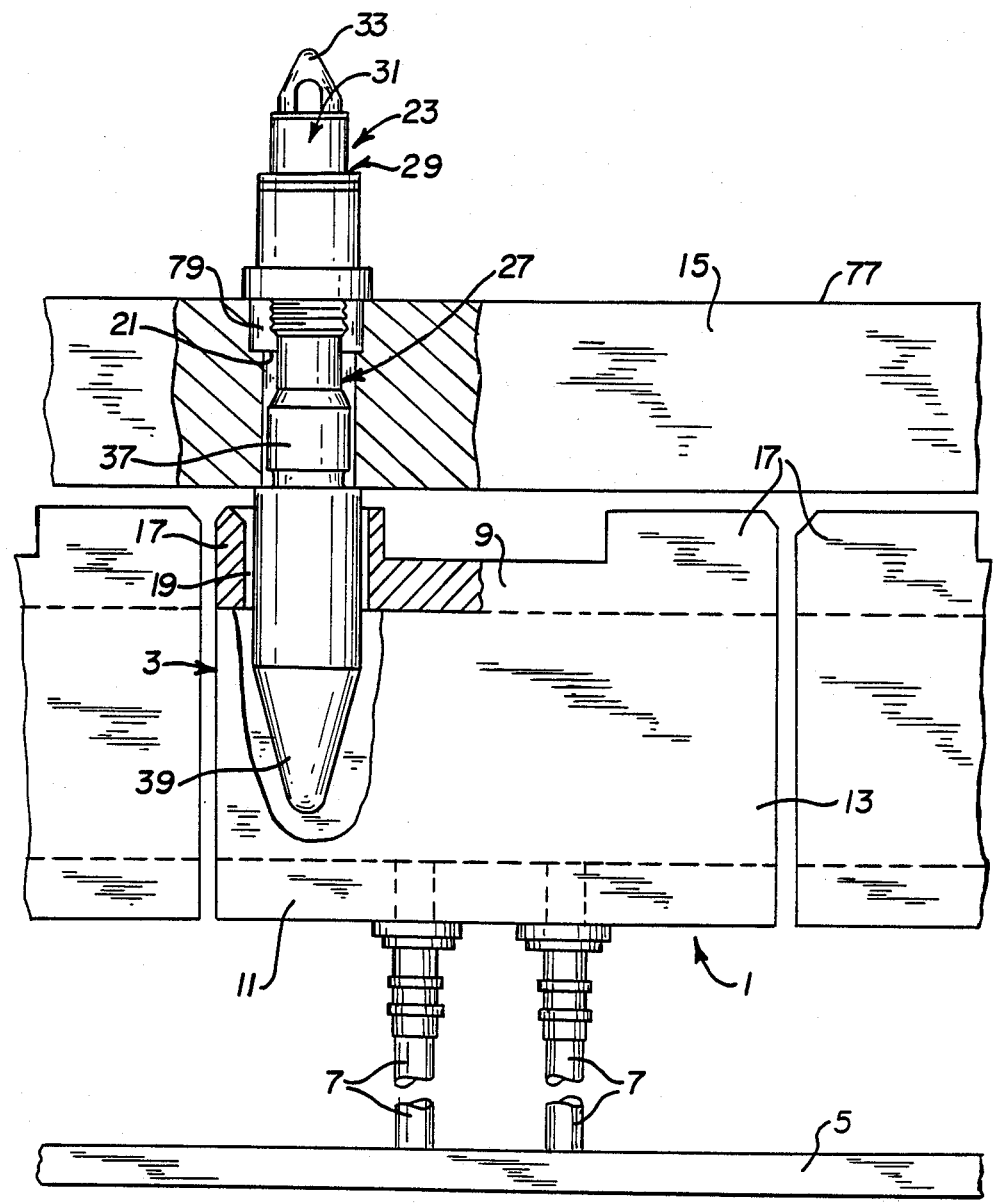
FIG. 1 is a schematic view of a portion of a fuel assembly of a pressurized water nuclear reactor showing the guide pin assembly of the invention in position within the upper core plate of the reactor and the top nozzle of the fuel assembly.

A typical fuel assembly 1 for a pressurized water nuclear reactor, partially illustrated in FIG. 1, includes a top nozzle 3, a bottom nozzle 5, and a plurality of guide tubes 7 extending between the top nozzle 3 and the bottom nozzle 5. The top nozzle 3 includes an upper hold down plate 9, a lower adapter plate 11, below, and spaced from, the upper hold down plate 9, and an enclosure 13 forming a sidewall and extending between the upper hold down plate 9 and the lower adapter plate 11.

A fuel assembly 1 is positioned below the upper core plate 15 of the nuclear reactor so that the guide tubes 7 are aligned with the control rods (not shown) in the nuclear reactor core. In this way, the control rods can be inserted within, and withdrawn from, the reactor core through the guide tubes 7. The raised corners of the upper hold down plate 19 of the top nozzle 3 include second bores 19, which are aligned with first bores 21 in the upper core plate 15 using the guide pin assembly 23 of the invention to properly position the fuel assembly 1. Further, the corners of the enclosures 13 of the top nozzles 3 of the four adjacent fuel assemblies 1 form a recess 25 to receive a portion of the guide pin 27 of a guide pin assembly 23 extends below the second bore 19 so that it is disposed within the enclosure 13 of the top nozzle 3. Generally, two guide pin assemblies 23 are used, one each at opposite corners (17) of the upper hold down plate 9 of each top nozzle 3.

The guide pin assembly 23 of the invention includes a guide pin 27, nut 29 and locking cup 31. The guide pin 27 has a generally circular cross-section, and includes a nose 33, a threaded portion 35, a shaft 37 and an end 39.

Figure 2:
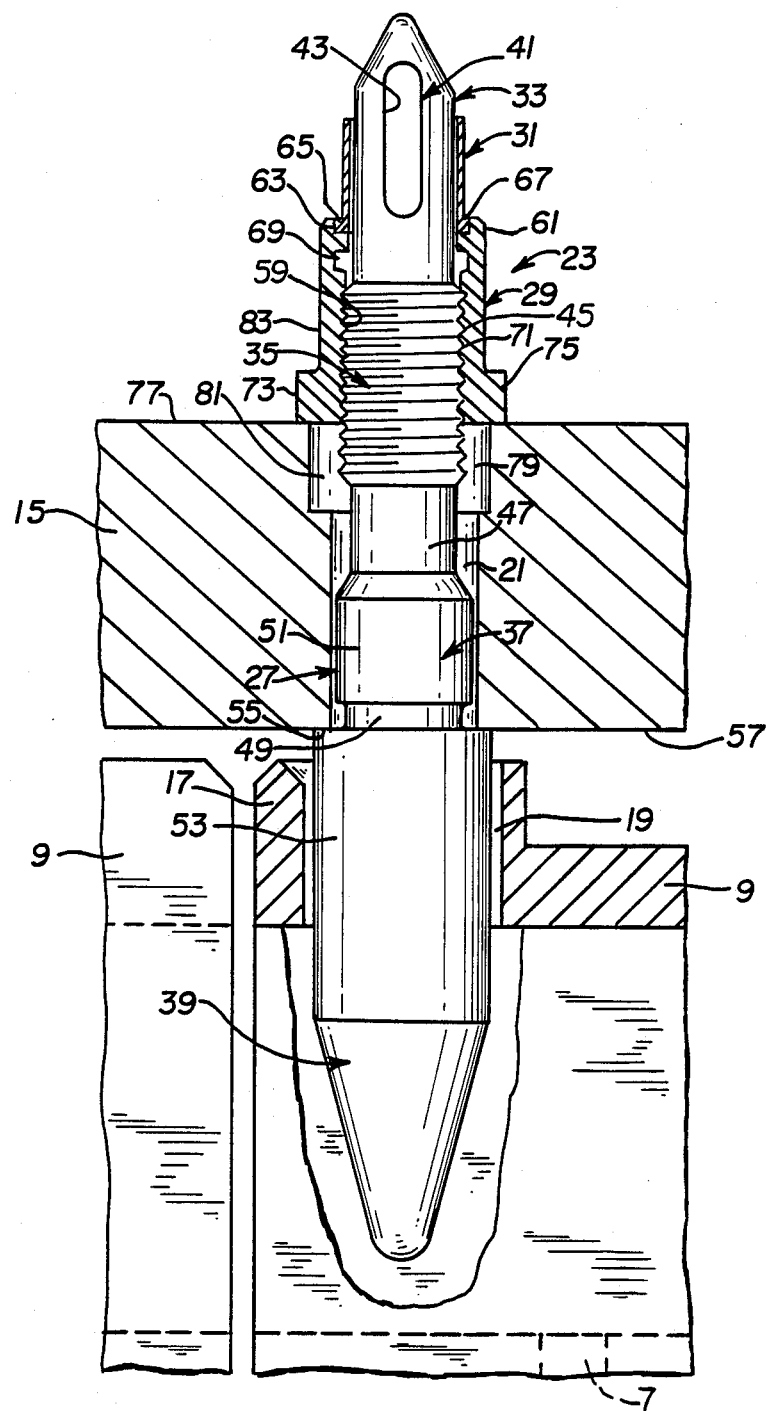
FIG. 2 is a view, partly in section, of the guide pin assembly of the invention.

The nose 33 of the guide pin 27 (FIG. 2) has engagement means 41 thereon which coact with the locking cup 31 to secure the locking cup 31 to the nose 33 once the guide pin 27 is inserted within the first bores 21 in the upper core plate 15 and the nut 29 is tightened on the threaded portion 35. Preferably, the engagement means 41 is a plurality of elongated slots 43 spaced annularly about the nose 33. The nose 33 is pointed so as to facilitate the insertion of the guide pin 27 within the first bores 21 of the upper core plate 15.

The threaded portion 35 of the guide pin 27, adjacent the nose 33, has a threaded outer surface 45. The threaded outer surface 45 coacts with the nut 29 to enable the nut 29 to be tightened against the threaded portion 35 of the guide pin 27.

The shaft 37 of the guide pin 27, adjacent the threaded portion 35, has an upper section 47, a lower section 49, and a radial alignment section 51 between the upper section 47 and lower section 49. The radial alignment section 51 of the shaft 37 has a diameter that is approximately the diameter of the first bore 21 in the upper core plate 15 of the nuclear reactor fuel assembly 1 so that the guide pin 27 cannot move radially within the first bore 21. Preferably, the diameters of the upper section 47 and the lower section 49 of the shaft 37 are less than those of the radial alignment section 51 so that the guide pin 27 can be easily inserted within the first bores 21 of the upper core plate 15.

The end 39 of the guide pin 27, adjacent the shaft 37, includes a top 53 having a diameter greater than that of the diameter of the first bore 21 in the upper core plate 15. The shoulder 55, resulting from the difference in diameters between the top 53 of the end 39 of the guide pin 27 and the lower section 49 of the shaft 37 of the guide pin 27, abuts the bottom surface 57 of the upper core plate 15 and serves to stabilize the guide pin 27 against vibration.

The inner surface 59 of the top 61 of the nut 29 includes a first groove 63 to receive an annular flange 65 about the bottom 67 of the locking cup 31, and a second groove 69, disposed below the first groove 63. The inner surface 59 of the nut 29 further includes a tapped portion 71 that, when tightened against the threaded surface 45 of the threaded portion 35 of the guide pin 27, secures the guide pin 27 within the second bore 19 of the upper hold down plate 9 and the first bore 21 of the upper core plate 15.

An annular flange 73 about the lower end 75 of the nut 29 is adapted to abut the upper surface 77 of the upper core plate 15 when the nut 29 is tightened on the theaded portion 35 of the guide pin 27. Thus, the annular flange 73 has a diameter greater than that of countersunk portion 79 in the upper end 81 of the first bore 21 of the upper core plate 15.

The nut 29 may further include a plurality of indentations (not shown) spaced annularly about the outer surface 83 of the nut 29 by which a tightening tool can grip the nut 29 to tighten the nut 29 by about the guide pin 27.

The locking cup 31 is securable, preferably permanently securable, about the nut 29. Thus, the annular flange 65 about the bottom 67 of the annular locking cup 31 is securable within the first groove 63 in the inner surface 59 of the top 61 of the nut 29, such as by a weld. The locking cup 31 coacts with the engagement means 41 on the nose 33 of the guide pin 27 when the nut 29 has been tightened onto the threaded surface 45 of the threaded portion 35 of the guide pin 27 so that the flange 73 of the pin 29 abuts the upper surface 77 of the upper core plate 15 of the nucler reactor. Thus, the locking cup 31 can be crimped about the slots 43 in the nose 33 of the guide pin 27.

The guide pin assembly 23 of the invention is typically installed by first placing the end 39 of the guide pin 27 within a second bore 19 in the upper hold down plate 9 of the top nozzle 3 of the nuclear reactor. The nose 33 of the guide pin 27 is then inserted within the aligned first bore 21 in the upper core plate 15 from the bottom surface 57 of the upper core plate 15 until the shoulder 55 formed between the shaft 37 and the end 39 of the guide pin 27 contacts the bottom surface 57 of the upper core plate 15. The nose 33 and at least a portion of the threaded portion 35 of the guide pin 27 protrude above the upper surface 77 of the upper core plate 15. The nut 29 is then threaded onto the threaded surface 45 of the threaded portion 35 of the guide pin 27 and tightened to a torque of preferably between about 40 and about 45 foot pounds. The locking cup 31 is then crimped about the slots 43 in the nose 33 of the guide pin 27.

The guide pin assembly 23 of the invention is remotely installable within the nuclear reactor. That is, the guide pin assembly 23 can be installed within the second bores 19 and first bores 21 of the upper hold down plate 9 of the top nozzle 3 and the upper core plate 15, respectively, in an operating nuclear reactor without the risk of exposing plant personnel to dangerous levels of radiation.

What is claimed is:

1. A guide pin assembly for aligning the upper hold down plate of the top nozzle of a fuel assembly with the upper core plate of a pressurized water nuclear reactor comprising:
   a guide pin having a generally circular cross-section including:
      a nose having engagement means thereon;
      a threaded portion, adjacent said nose, having a threaded outer surface;
      a shaft, adjacent said threaded portion, having an upper section, a lower section, and a radial alignment section between said upper and lower sections, said radial alignment section of said shaft having a diameter that is approximately the diameter of a first bore in the upper core plate of a nuclear reactor, said lower section of said shaft having a diameter less than that of said radial alignment section; and
      an end, adjacent said shaft, including a top having a diameter greater than that of the diameter of the said first bore in the said upper core plate;
      said guide pin being adapted to be inserted within a second bore in the upper hold down plate of the top nozzle of a fuel assembly and through the said first bore in the said upper core plate of a nuclear reactor from the bottom of the said first bore in the said upper core plate so that said nose and at least a portion of said threaded portion of said guide pin protrude above the said upper core plate;
   a nut adapted to be threaded onto said threaded surface of said guide pin, said nut including a top and a bottom; and an annular locking cup securable about said nut and adapted to engage said engagement means on said nose of said guide pin when said nut has been tightened onto said threaded surface of said threaded portion of said guide pin so that said bottom of said nut abuts the upper surface of the said upper core plate.

2. The guide pin assembly of claim 1 in which said engagement means on said nose is a plurality of elongated, annularly spaced slots.

3. The guide pin assembly of claim 2 in which said locking cup is adapted to be crimped about said nose of said guide pin.

4. The guide pin assembly of claim 1 in which said nut includes a first groove in the inner surface thereof and said locking cup includes an annular flange about the lower end thereof which is receivable within said first groove of said nut.

5. The guide pin assembly of claim 1 in which said locking cup is permanently securable to said nut.

6. A guide pin assembly for aligning the upper hold down plate of the top nozzle of a fuel assembly with the upper core plate of a pressurized water nuclear reactor comprising:
  a guide pin having a generally circular cross-section including:
    a nose having a plurality of elongated, annularly spaced slots thereon;
    a threaded portion, adjacent said nose, having a threaded outer surface;
    a shaft, adjacent said threaded portion, having an upper section, a lower section, and a radial alignment section between said upper and lower sections, said radial alignment section of said shaft having a diameter that is approximately the diameter of a first bore in the upper core plate of a nuclear reactor, said lower section of said shaft having a diameter less than that of said radial alignment section; and
    an end, adjacent said shaft, including a top having a diameter greater than that of the diameter of the said first bore in the said upper core plate;
  said guide pin being adapted to be inserted within a second bore in the upper hold down plate of the top nozzle of a fuel assembly and through the said first bore in the said upper core plate of a nuclear reactor from the bottom of the said first bore in the said upper core plate so that said nose and at least a portion of said threaded portion of said guide pin protrude above the said upper core plate;
  a nut adapted to be threaded onto said threaded surface of said threaded portion of said guide pin, said nut including a top, a bottom, and a first groove in the inner surface thereof; and
  an annular locking cup having an annular flange about the lower end thereof which is receivable within said first groove of said nut to secure said locking cup to said nut and said locking cup being adapted to be crimped about said slots on said nose of said guide pin when said nut has been tightened onto said threaded surface of said threaded portion of said guide pin so that said bottom of said nut abuts the upper surface of the said upper core plate.

7. A fuel assembly for a pressurized water nuclear reactor comprising:
  a top nozzle, a bottom nozzle, and a plurality of guide tubes extending between said top nozzle and said bottom nozzle, said top nozzle having an upper hold down plate with at least one second bore therethrough aligned with a first bore in the upper core plate of a said pressurized water nuclear reactor, said first and second bores being adapted to receive a guide pin to align said fuel assembly with said upper core plate so that said fuel assembly is disposed below, and spaced from, said upper core plate;
  at least one guide pin having a generally circular cross-section, a nose, a threaded portion adjacent said nose, a shaft adjacent said threaded portion, and an end adjacent said shaft, said nose having engagement means thereon, said threaded portion having a threaded outer surface, said shaft having an upper section, a lower section, and a radial alignment section between said upper and lower sections, said radial alignment section of said shaft having a diameter that is approximately the diameter of said first bore in said upper core plate of a nuclear reactor, said lower section of said shaft having a diameter less than that of said radial alignment section, said end including a top having a diameter greater than that of the diameter of said first bore in said upper core plate, said guide pin being inserted within a said second bore in said top nozzle and a said first bore in said upper core plate so that said nose and at least a portion of said threaded portion of said guide pin protrude above said upper core plate;
  a nut, including a top and a bottom, threaded on to said threaded portion of said threaded surface of said guide pin so that said bottom of said nut abuts the upper surface of said upper core plate; and
  an annular locking cup secured about said nut and engaging said engagement means on said nose of said guide pin.

8. The nuclear reactor fuel assembly of claim 7 in which said fuel assembly includes two guide pins.

9. The nuclear reactor fuel assembly of claim 7 in which said engagement means on said nose is a plurality of elongated, annularly spaced slots.

10. The nuclear reactor fuel assembly of claim 9 in which said locking cup is crimped about said nose of said guide pin.

11. The nuclear reactor fuel assembly of claim 7 in which said nut includes a first groove in the inner surface thereof and said locking cup includes an annular flange about the lower end thereof which is received within said first groove of said nut.

12. The nuclear reactor fuel assembly of claim 7 in which said locking cup is permanently secured to said nut.

* * * * *